Aug. 4, 1953 A. PSARRIS 2,647,779
SKID PREVENTER FOR AUTOMOBILES
Filed May 24, 1951 2 Sheets-Sheet 2
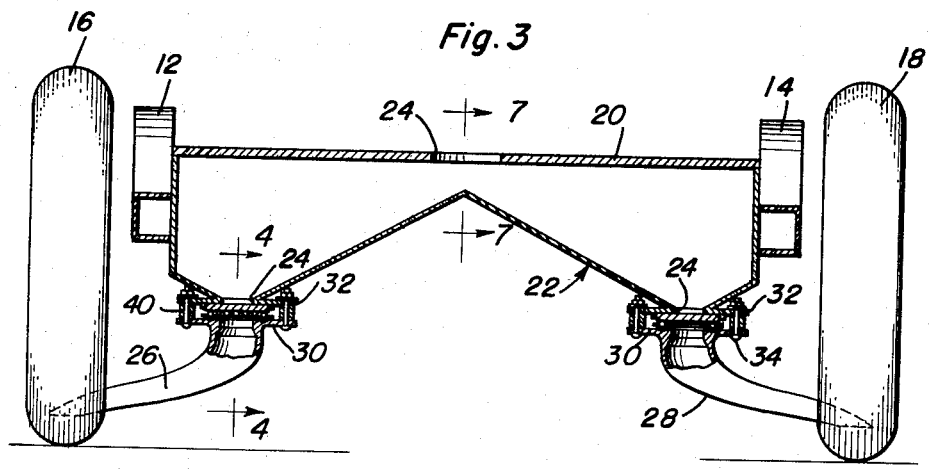
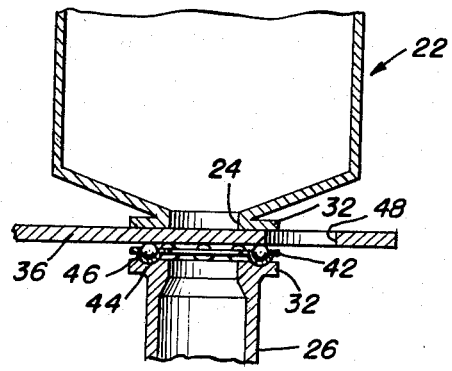
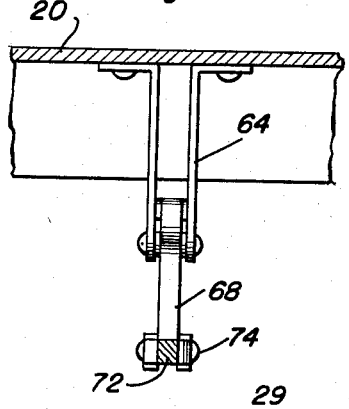
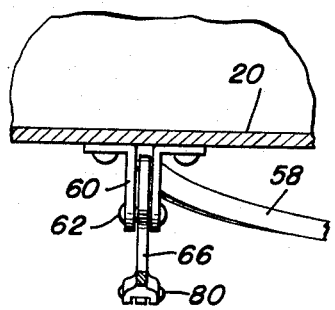
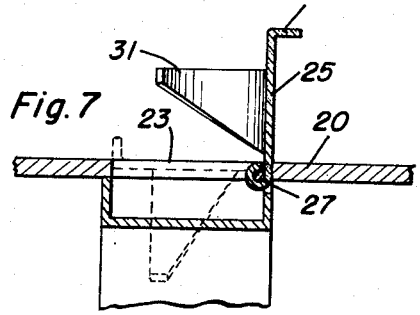
Alice Psarris
INVENTOR.
BY *Clarence A. O'Brien and Harvey B. Jacobson*
Attorneys Patented Aug. 4, 1953

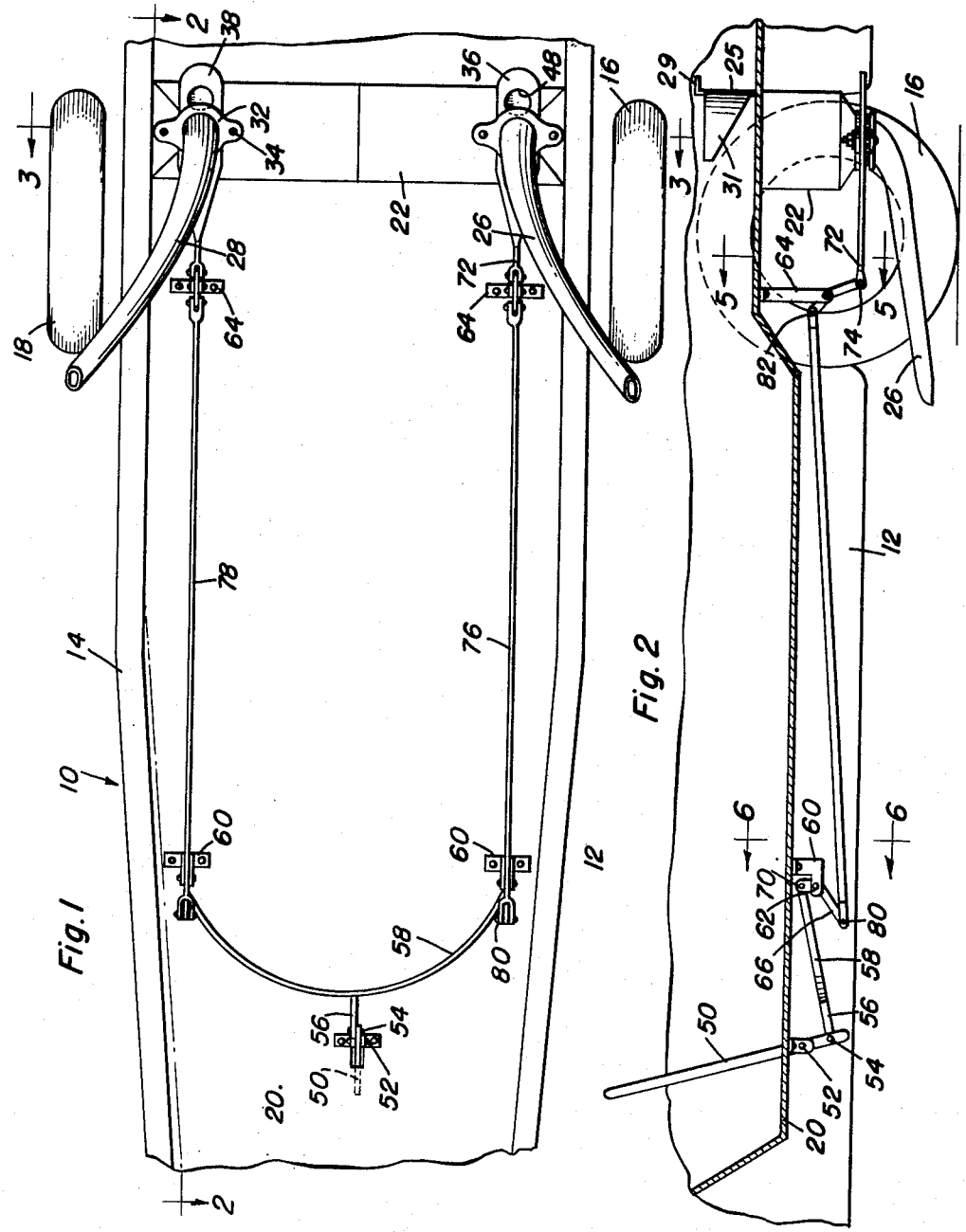

2,647,779

UNITED STATES PATENT OFFICE 2,647,779

SKID PREVENTER FOR AUTOMOBILES

Alice Psarris, Lowell, Mass.

Application May 24, 1951, Serial No. 227,976

2 Claims. (Cl. 291—34)

The present invention relates to new and useful improvements in sanding devices for automobiles, the general purpose of which is to improve traction and reduce skidding.

In addition to the usual basic objects of devices of this character, it is an important object of this invention to provide a device of this character which may be installed on modern automobiles without detracting from the appearance of the same, and which will be very easy to charge with sand.

Another important object of this invention is to provide a device of this character that is readily adapted for use on a wide variety of different makes and models of automobiles, and in which the simultaneous discharge of sand to both of the traction wheels may be accurately controlled and regulated, and in which the control means are not likely to interfere with the driving, braking or suspension assemblies of the automobile.

A meritorious feature of the present invention resides in the means for controlling the valves in the discharge spouts of the sandbox, such means including a pair of connecting rods disposed adjacent the opposite sides of the automobile, together with a yoke and a single control lever for actuating the valves through the connecting rods.

Another important feature of the present invention resides in the provision of antifriction means in the discharge spout for supporting the sliding valve plate, so as to insure smooth operation of the latter.

A final feature to be specifically enumerated herein resides in the provision of a pivoted closure for the sandbox, which in the open position facilitates the introduction of sand in the sandbox.

These, together with various ancillary objects and features of the invention which will become apparent as the following description proceeds are attained by the present invention, a preferred embodiment of which has been illustrated by way of example only in the accompanying drawings, wherein:

Figure 1 is a bottom plan view of the present invention, showing the same installed on an automobile that is only partially shown;

Figure 2 is a sectional view taken upon the plane of the section line 2—2 of Figure 1;

Figure 3 is a transverse vertical sectional view taken upon the plane of the section line 3—3 of Figure 2;

Figure 4 is an enlarged vertical sectional detail view taken upon the plane of the section line 4—4 of Figure 3;

Figure 5 is an enlarged vertical transverse sectional view taken upon the plane of the section line 5—5 of Figure 2;

Figure 6 is still another enlarged sectional detail view, this view being taken upon the plane of the section line 6—6 of Figure 2;

Figure 7 is an enlarged sectional detail view taken upon the plane of the section line 7—7 of Figure 3, an alternate position of the closure member being indicated in dotted line.

Reference is now made more specifically to the accompanying drawings, wherein like numerals designate similar parts throughout the various views, and in which a portion of a conventional automobile designated generally at 10, the same consisting of longitudinally extending frame members 12 and 14, traction wheels 16 and 18, and a body 20, all of conventional design.

A sandbox designated generally at 22 is secured to the frame members 12 and 14 adjacent the rear of the automobile 10, and the sandbox 22 is fitted against the underside of the body 20 so that the latter closes the top of the sandbox 22 as clearly shown in Figures 2 and 3. In a preferred construction, the sandbox 22 underlies that portion of the body 20 forming the bottom of the luggage transport compartment of the vehicle (not shown) closed. In order that the sandbox 22 be conveniently filled, the portion of the body 20 overlying the sandbox 22 is provided with a filling opening 23, and such opening 23 is provided with a pivoted closure 25. As best shown in Figure 7, the closure 25 is hinged to the body 20 adjacent the opening 23, as at 27, and such closure is provided with an upturned extremity 29 which constitutes a finger grip for opening and closing the closure 25, and in addition the closure 25 is provided with a pair of curved flanges or ears 31, which flanges 31 serve as guides or a chute for directing material into the opening 23 when the sandbox 22 is being filled, it being noted that when the closure 25 is swung to the dotted line position to close the opening 23, such flanges 31 project downwardly into the sandbox 22.

The bottom wall of the sandbox 22, as clearly illustrated in Figures 3 and 4, is sloped so that the contents thereof will tend to drain towards a pair of laterally spaced discharge openings 24, and carried by the sandbox 22 in a position to receive the contents from the sandbox 22 is a pair of discharge spouts 26 and 28, such discharge spouts 26 and 28 being so arranged as to distribute sand from the sandbox 22 in the travel path and in advance of the traction wheels 16 and 18, respectively. The discharge spouts 26 and 28 are secured to the sandbox 22 by means of flanges 30 on the upper ends of the discharge spouts, flanges 32 on the sandbox 22, and nutted bolts 34 extending through the flanges 30 and 32, as will be evident upon inspection of the drawings. Means is provided for controlling the amount of sand permitted to enter the discharge spouts from the sandbox 22, such means comprising slide valves 36 and 38 disposed between the openings 24 in the bottom of the sandbox 22 and the upper ends of the discharge spouts 26 and 28, respectively. In order to insure free movement of the valve plates 36 and 38, spacers 40 are positioned about the nutted bolts 34 and seated between the flanges 30 and 32 to retain the latter in fixed spaced relation, and in addition, a bearing ring 42 is carried by each of the spouts 26 and 28, the upper ends of the latter being suitably concaved as at 44 to provide a seat for the rings 42. As clearly shown in the drawings, the rings 42 serve as bearing races and support antifriction balls 46 that are in rolling contact with the undersurfaces of the sliding valve plates 36 and 38.

The sliding valve plates 36 and 38 are provided with openings 48, so that the sliding valve plates may be shifted selectively between the positions shown of the valve plates 36 in Figure 4 wherein the valve plate closes the opening 24 to a position wherein the opening 48 in the valve plate is in registry with the opening 24 in the sandbox 22. It will thus be seen that by suitable manipulation of the sliding valve plates 36 and 38, the discharge of sand from the sandbox 22 may be controlled, it being pointed out that the antifriction means 42 and 46 permit free movement of the sliding valve plates, and prevent binding of the same with sand.

Means is provided for actuating the sliding valve plates 36 and 38, such means comprising a control lever 50 (see Figures 1 and 2) which is pivoted intermediate its ends, as at 52 to the body 20 for swinging movement in a vertical arc, it being noted that the lever 50 projects upwardly to the bottom of the body 20 to a position accessible by the operator of the automobile 10. The lower extremity of the lever 50 is pivoted, as at 54 to a forwardly projecting portion 56 of a yoke 58. The yoke extends rearwardly and the extremities thereof terminate adjacent a pair of transversely spaced brackets 60, each of said brackets 60 consisting of a pair of spaced angle members secured to the body 20 and connected to each other by a pivot pin 62. A similar pair of transversely spaced brackets 64 are secured to the body 20 in a position to the rear of the brackets 60 and pairs of levers 66 and 68 are pivotally mounted on the pivot pins of the brackets 60 and 64, respectively. The trailing free ends of the yoke 58 are pivotally connected to the upper ends of the levers 66 at 70, and arms 72 carried at the forward ends of the sliding valve plates 36 and 38 are pivotally connected to the lower ends of the levers 68, as at 74. Longitudinally extending connecting rods 76 and 78 are disposed below offset sides of the body 20, and have their forward and rear ends pivotally connected to the upper and lower ends of the levers 66 and 68, respectively, as at 80 and 82. It will thus be seen upon comparing Figures 1 and 2, that upon rearward movement of the upper end of the control lever 50, the valve plates 36 and 38 are simultaneously moved forward so that the openings in such valve plates are brought into registry with the openings at the bottom of the sandbox 22, and reverse movement of the valve plates will occur upon forward movement of the upper end of the control lever 50. Thus, by the use of the single control lever 50, both of the control valves 36 and 38 may be actuated simultaneously. It will be obvious that by the use of the yoke 58 and the laterally spaced connecting rods 76 and 78, the means operatively connecting the control lever 50 to the valve plates 36 and 38 leaves ample space for the conventional driving and suspension means for the automobile 10.

From the foregoing, the construction and operation of the device will be readily understood and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having described the invention, what is claimed as new is:

1. A sanding device for automobiles comprising a sandbox, adapted to be mounted below the rear portion of the body of an automobile and having a filling opening adapted to be accessible from within the luggage trunk of the automobile, said sandbox having a pair of laterally spaced discharge spouts adapted to discharge the contents of the sandbox in the path of the traction wheels of the automobile, slide valves operatively disposed in the spouts to control the discharge of sand, ball bearing means carried by the spouts and supporting the valves for sliding movement thereon, said ball bearing means surrounding the discharge passages through the spouts, means for operating said valves comprising a control lever adapted to be pivotally mounted on the automobile adjacent the operator's position, a yoke pivoted intermediate its ends to the control lever and adapted to be disposed below the body of the automobile, and linkage means for operatively connecting the ends of the yoke to the valves.

2. A sanding device, for use in spreading sand in the path of a vehicle wheel during motion, comprising the combination of a sand box removably fixed to the underside of the vehicle behind a traction wheel; an elongated discharge spout connecting with the lower portion of said container and extending downwardly therefrom to direct sand from a discharge opening into the path of said traction wheel; a valve plate, having a sand opening therethrough, slidably mounted between said spout discharge opening and said sand box; mechanical means, operable from the driver's compartment of said vehicle, for sliding said valve plate into and out of a position of registration of said sand opening with said discharge spout, and freely revoluble, antifriction bearings positioned outside the periphery of said discharge spout for supporting said valve plate during said sliding.

ALICE PSARRIS.

References Cited in the file of this patent

UNITED STATES PATENTS

| Number | Name | Date |
| --- | --- | --- |
| 1,353,560 | Beil | Sept. 21, 1920 |
| 1,501,650 | Dienstbach et al. | July 15, 1924 |
| 1,545,885 | Crane et al. | July 14, 1925 |
| 1,739,713 | Dodge | Dec. 17, 1929 |
| 2,036,030 | Feins | Mar. 31, 1936 |

FOREIGN PATENTS

| Number | Country | Date |
| --- | --- | --- |
| 750,934 | France | Aug. 22, 1933 |
| 12,397 of 1902 | Great Britain | Apr. 16, 1903 |